Oct. 12, 1948. D. P. ANDERSON ET AL 2,451,053
CONVEYING MECHANISM FOR BILLET HEATING FURNACES
Filed June 15, 1945 6 Sheets-Sheet 1

Inventors
STRICKLAND KNEASS, JR.
DAVID P. ANDERSON
By Albert G. Blodgett
Attorney Oct. 12, 1948.　　　D. P. ANDERSON ET AL　　　2,451,053
CONVEYING MECHANISM FOR BILLET HEATING FURNACES
Filed June 15, 1945　　　　　　　　　　　6 Sheets-Sheet 3

Inventors
STRICKLAND KNEASS, JR.
DAVID P. ANDERSON
By Albert G. Blodgett
Attorney Inventors
STRICKLAND KNEASS, JR.
DAVID F. ANDERSON
By Albert G. Blodgett
Attorney Inventors
STRICKLAND KNEASS, JR.
DAVID P. ANDERSON
By Albert G. Blodgett
Attorney Patented Oct. 12, 1948

2,451,053

UNITED STATES PATENT OFFICE 2,451,053

CONVEYING MECHANISM FOR BILLET HEATING FURNACES

David P. Anderson, Pittsburgh, Pa., and Strickland Kneass, Jr., Boylston, Mass., assignors to Morgan Construction Company, Worcester, Mass., a corporation of Massachusetts Application June 15, 1945, Serial No. 599,566

14 Claims. (Cl. 263—6)

1

This invention relates to conveying mechanism for billet heating furnaces, and more particularly to mechanism adapted for use in continuous furnaces for heating metal billets, the term "billets" being used herein in a broad sense to include metal bars of various sizes and cross-sections.

In the usual continuous billet heating furnace, the billets are charged at the rear end of the furnace on a level with the hearth, and they are pushed broadside along the hearth to the discharge end in a continuous solid line. Fuel is introduced at the front or discharge end of the furnace, and the hot gaseous products of combustion pass rearwardly over the tops of the billets to the chimney flue at the charging end. Only the top surfaces of the billets are exposed to the hot gases, and the heat transfer is largely by radiation. This heat transfer is rapid and efficient while the gases are incandescent, but it becomes much less effective as their temperature decreases. Since the length of the furnace is definitely limited, not only on economic grounds but often by restricted available space, the waste gases leaving the furnace contain a large portion of their original heat.

In order to overcome these difficulties and to increase the capacity and efficiency of the furnace, it has been proposed to arrange the incoming billets, as they approach the hearth, in a stack of open formation through which the gases flow downwardly after leaving the hearth. Thus heat is transferred to the billets in the stack largely by convection, and a considerable reduction is obtained in the temperature of the waste gases. In this prior furnace the superimposed layers of billets forming the stack have been held apart by transversely positioned spacer bars, and a serious mechanical problem is involved in removing these bars from the top of the stack and returning them to the bottom thereof. Furthermore, with the prior arrangement considerable difficulty is involved in clearing out the billets in the stack in the event this becomes necessary in order to repair the adjacent walls or for any other reason.

It is accordingly one object of the invention to provide a conveying mechanism for a continuous billet heating furnace having improved means for supporting a stack of billets in open formation to receive heat from a stream of hot gases, the construction being such that spacer bars are not required between the layers of billets.

It is a further object of the invention to provide a conveying mechanism for a continuous billet heating furnace having means to support a stack of billets in open formation to receive heat from a stream of hot gases, the construction being such that all the billets can readily

2 be moved along until the stack is completely exhausted when desired.

It is a further object of the invention to provide a conveying mechanism for a continuous billet heating furnace having means to support billets in a stack of open formation for the flow of hot gases in contact therewith, the construction being such that billets will travel progressively through the stack, whether or not new billets are added to the stack.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a longitudinal vertical section through a continuous billet heating furnace, the section being taken substantially on the line 1—1 of Fig. 2;

Figure 1:
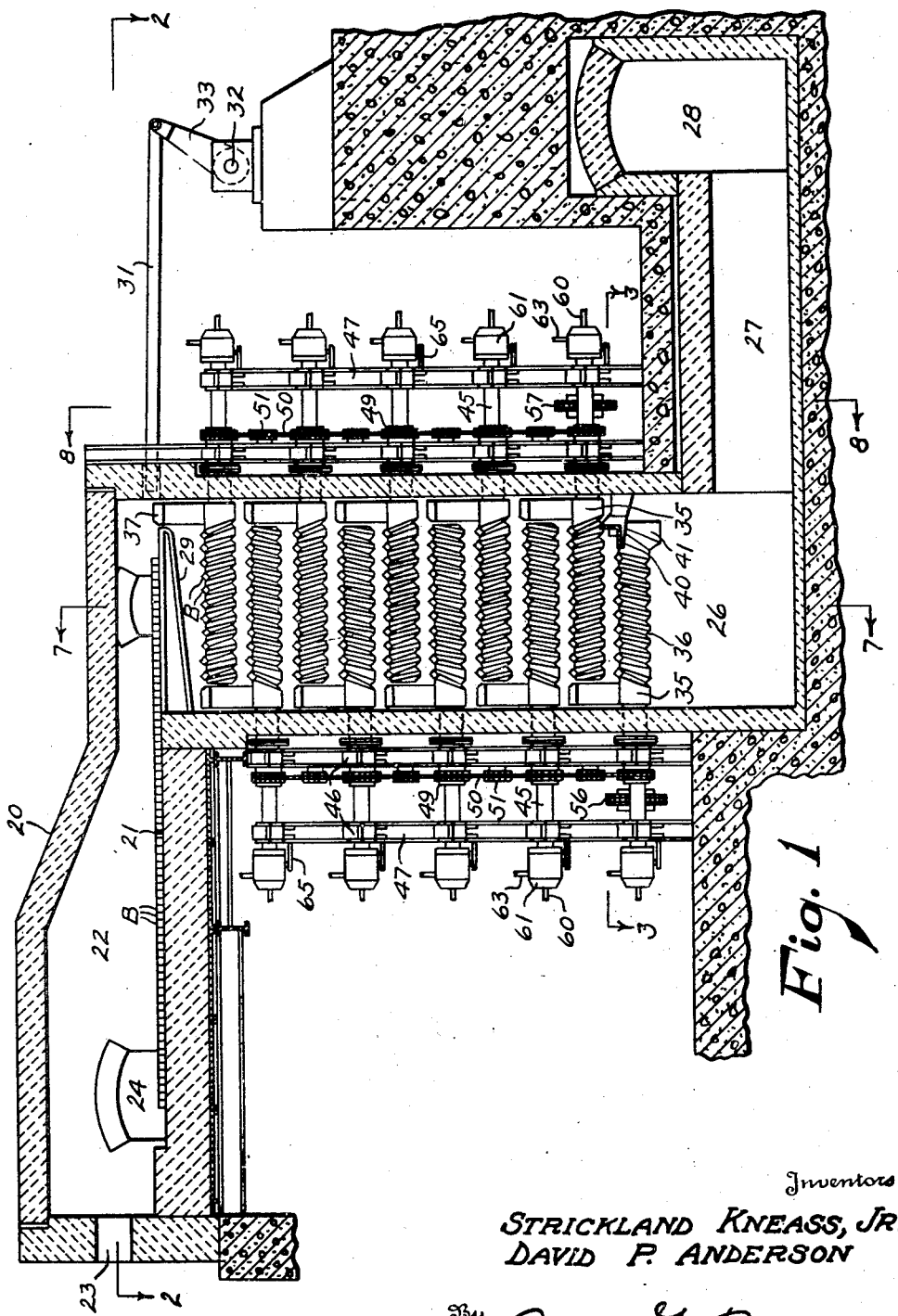
Figure 2:
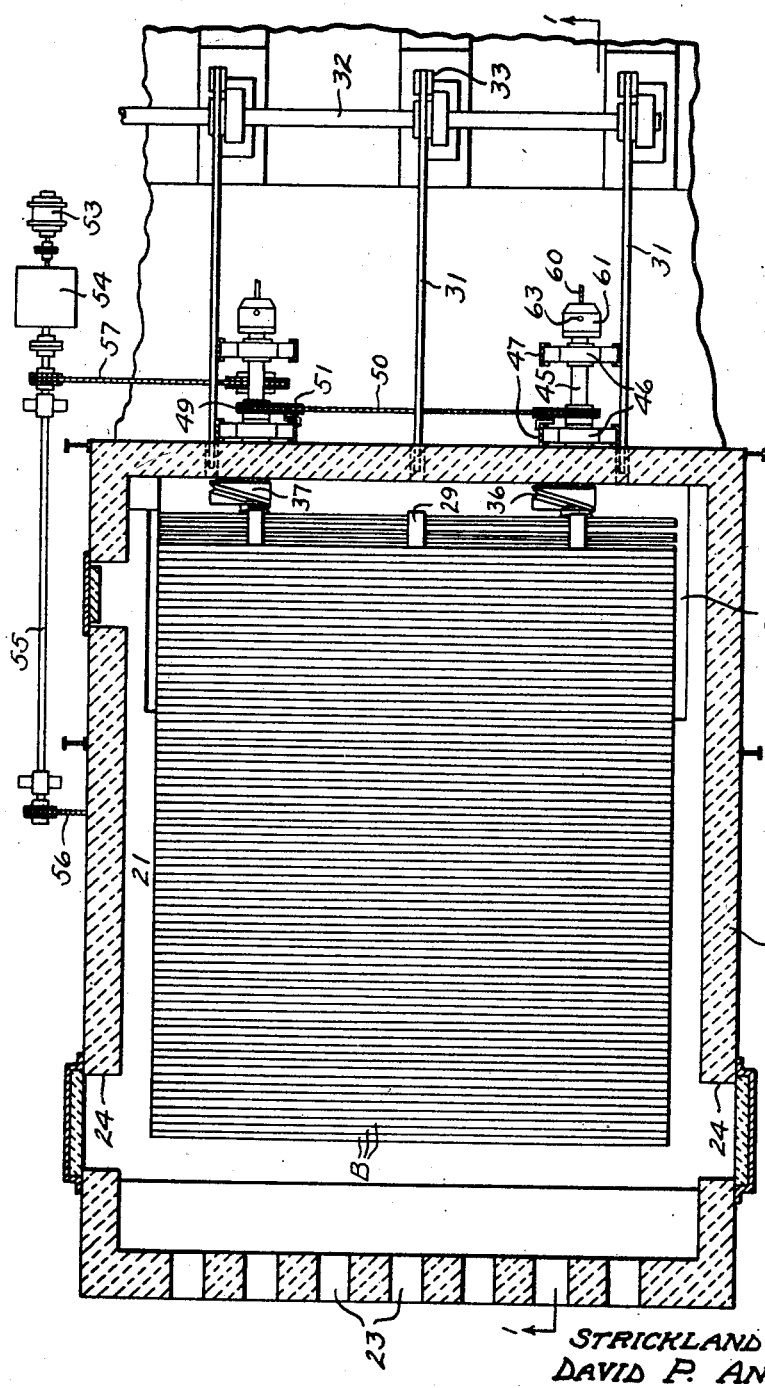
Fig. 2 is a plan view in section taken on the line 2—2 of Fig. 1.

The embodiment illustrated comprises a furnace 20 arranged for the continuous heating of elongated metal billets B and provided with the usual hearth 21 along which the billets are moved broadside toward the left as viewed in Fig. 1. Above the hearth there is provided a horizontal passage or chamber 22 through which hot gaseous products of combustion flow toward the right as viewed in Fig. 1. The front wall of the furnace is provided with burner openings 23 through which fuel and air may be introduced for combustion within the furnace, and the side walls of the furnace are provided with opposed door openings 24 near the front end of the furnace to permit the endwise discharge of the heated billets in known manner.

At the rear end of the furnace there is provided a vertical passage 26 which leads the gases downwardly from the rear portion of the horizontal passage 22. Horizontal branch flues 27 connect the lower end of the vertical passage 26 to a main flue 28 which leads to a suitable stack (not shown). Cantilever beams 29 extend rearwardly over the top of the vertical passage 26 to provide a rearward extension of the hearth 21. Horizontal pusher bars 31 project through openings in the rear wall of the passage 26, at the upper end thereof, and these bars are reciprocated to push the billets broadside along the beams 29 and the hearth 21. These bars are actuated by means of a transverse horizontal rock shaft 32 from which arms 33 extend upwardly to connect with the rear ends of the bars, the shaft being rocked by any suitable power device.

The billets within the passage 26 are supported in a series of vertically spaced substantially horizontal layers, with the billets in each layer spaced apart, to provide a stack of open formation through which the hot gases may flow downwardly in intimate contact with the billets. Furthermore the billets are moved broadside progressively through each layer within the plane of the layer in one direction, then upwardly to the next higher layer and through the same in the opposite direction, then upwardly to the next layer, and so on until the beams 29 are reached. Thus each billet starts in the bottom layer and travels through all the layers in a back and forth or zig-zag course until it is finally deposited on the beams 29 and comes within the range of operation of the pusher bars 31.

While various mechanical constructions may be utilized for the purpose, we preferably support each layer of billets on a plurality of substantially horizontal cantilever beams 35 which extend into the passage 26. The beams for the topmost layer project forwardly from the rear wall of the passage, and the beams for the next layer therebeneath project rearwardly from the front wall of the passage, this alternate positioning being continued throughout the entire construction. Means is provided to move the billets along the beams in a direction away from the free ends of the beams, and means is also provided to raise each billet past the free ends of the beams thereabove and place the billet on these upper beams.

Figures 3, 4, 5, 6:
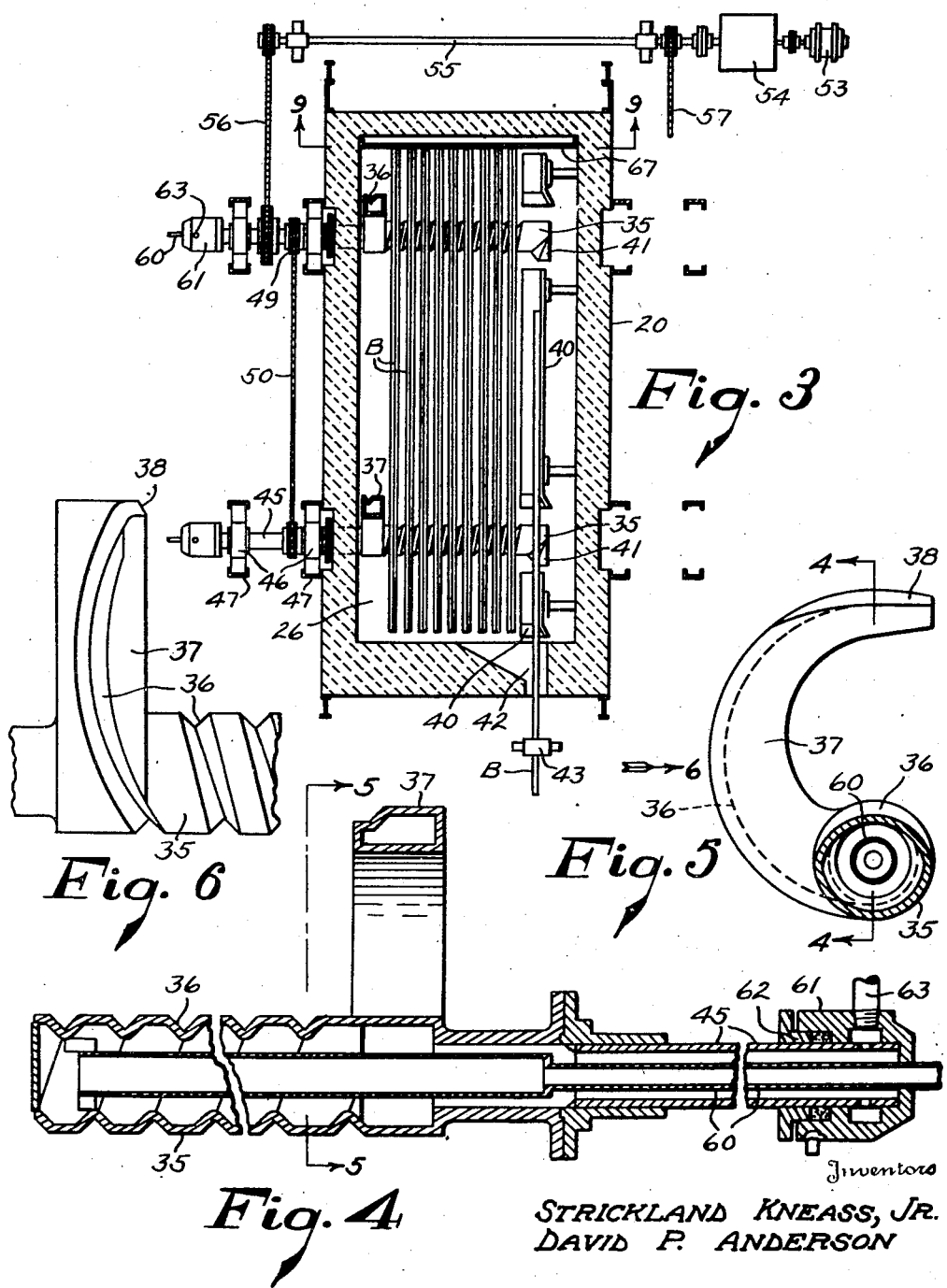
Fig. 3 is a plan view in section taken on the line 3—3 of Fig. 1.
Fig. 4 is an enlarged longitudinal section through a billet-supporting beam, taken on the line 4—4 of Fig. 5.
Fig. 5 is a section taken on the line 5—5 of Fig. 4.
Fig. 6 is a fragmentary elevation taken in the direction of the arrow 6 in Fig. 5.
Figure 14:
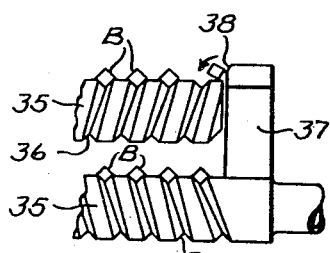
Fig. 14 is a view similar to Fig. 10, but showing the beam at the completion of one operating cycle.

In the preferred form of the invention, each beam 35 is constructed as a rotatable screw with a helical groove 36 therein to receive the billets and maintain the desired space relationship between the billets. Rotation of the screws brings about the desired lateral movement of the billets. Since the billets in adjacent layers must move in opposite directions, and since it is desirable that all the screws rotate in the same direction, the screws for successive layers are made alternately with right-hand and left-hand helical grooves 36. In order to lift the billets from one group of screws to the next, each screw is provided adjacent its supported end with a cam 37 arranged to revolve through the space between the adjacent passage wall and the free end of the next screw above. As best shown in Fig. 5, this cam 37 is shaped approximately as an upwardly extending spiral with a radius which increases in 180 degrees from that of the screw to a radius sufficient to raise the billets somewhat above the next higher screw for deposit thereon. The groove 36 continues from the screw 35 along the peripheral surface of the cam, the lead of the helix preferably being increased adjacent the cam to avoid interference between the cam and the billets. As shown in Fig. 6, for about one half the extent of the cam, the groove 36 is inclined outwardly in a helix of the same hand as on the screw, and from then on the helix is reversed to move the billets inwardly. At the upper end of the cam, the inner side of the groove is omitted and the outer side is steepened at 38 to slide the billets off by gravity in the manner indicated in Fig. 14.

Referring now to Figs. 1 and 3, it will be seen that L-shaped guides 40 are mounted in the passage 26 in position to support a billet immediately above the free end portions of the lowermost screws 35. These end portions are provided with cams 41 having inclined inner lateral surfaces arranged to engage the billets, upon rotation of the screws, and shift them laterally into the grooves 36. The billets are delivered one at a time to the guides 40 through an opening 42 in one sidewall of the passage 26 (Fig. 3) by means of pinch rolls 43.

Figure 8:
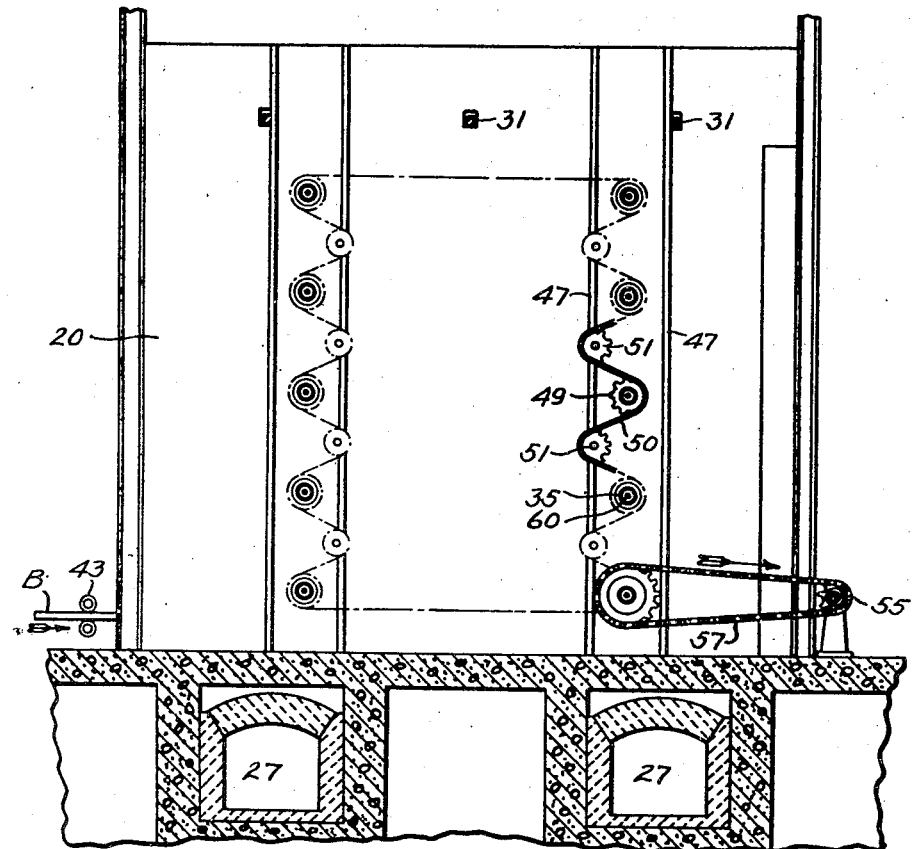
Fig. 8 is a section taken on the line 8—8 of Fig. 1.

Each of the screws 35 is supported at one end by a shaft 45 which is preferably formed as a separate piece suitably secured to the screw. Each shaft 45 is rotatably mounted in two axially spaced bearings 46 located outside the passage 26 and carried by upright columns 47. Because of the alternate positioning of the groups of screws 35, some of the shafts 45 are located behind the passage and others are located in front of the passage. Each shaft is provided with a sprocket wheel 49, and as shown in Fig. 8, all of these sprocket wheels at the rear of the gas passage are connected by an endless chain 50, idler wheels 51 being provided where necessary to obtain sufficient wrapping of the chain about the wheels 49. The shafts at the front of the gas passage are similarly connected. All of the shafts 45 are driven from an electric motor 53 (Fig. 3) which is connected by a speed-reduction unit 54 to a main shaft 55, this shaft being connected by two chain-and-sprocket drives 56 and 57 to two of the shafts 45 located respectively in front of and behind the gas passage.

The screws 35 are protected from the heat of the gases in the passage 26 by circulating cooling water through the interior of the screws, which are of hollow construction as shown in Fig. 4. For this purpose the shafts 45 are also made hollow, and a water supply pipe 60 extends axially through each shaft and the corresponding screw. A water collecting box 61, with a packing gland 62, is mounted on the outer end of each shaft 45, and an outlet pipe 63 is connected to each box. Brackets 65 (Fig. 1) project from the outer bearings 46 to engage the boxes 61 and prevent rotation thereof.

Figure 7:
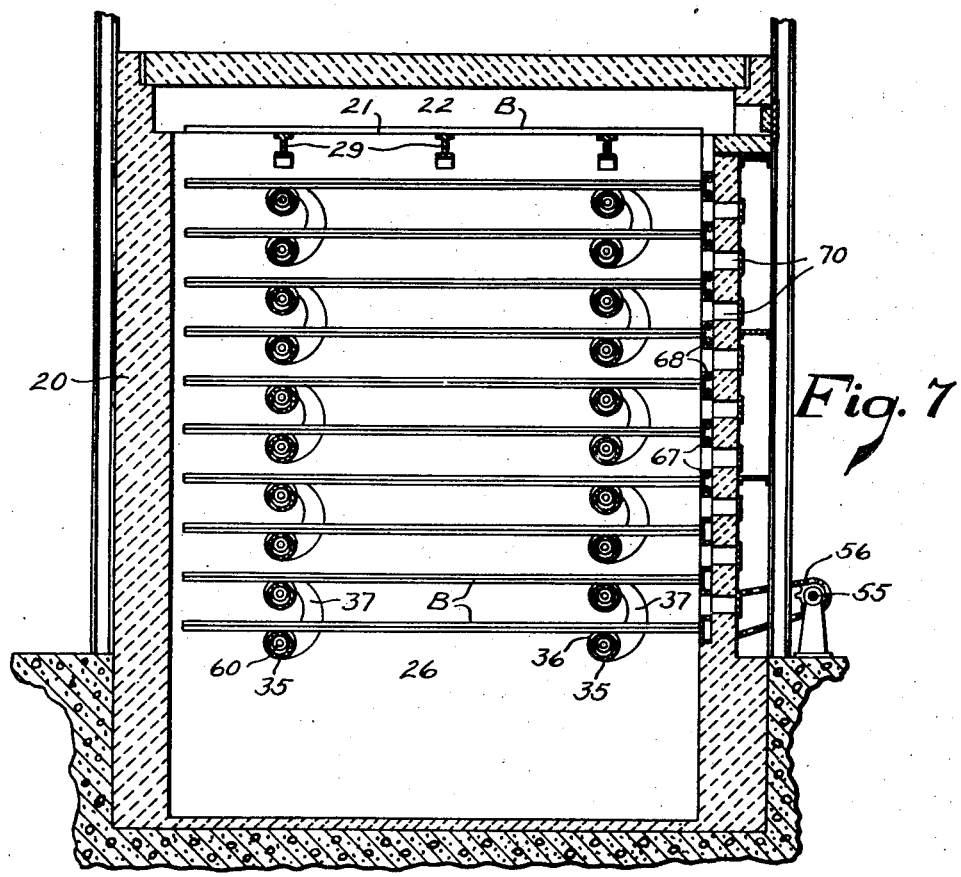
Fig. 7 is a section taken on the line 7—7 of Fig. 1.

The friction between the screws 35 and the billets B will cause a slight endwise pressure of the billets against the right-hand sidewall of the passage 26, as viewed in Fig. 7. In order to prevent this pressure from damaging the wall, the wall is lined with metal plates 67 along the path followed by the ends of the billets. Water circulating pipes 68 are mounted behind these plates, except in the lower or cooler portion of the passage, so that the plates will be cooled by radiating heat to the pipes. Observation doors 70 are preferably installed between the plates 67.

Figure 10:
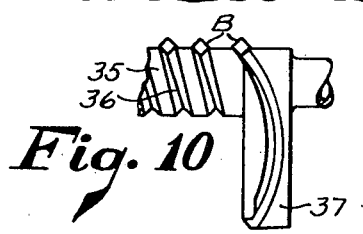
Fig. 10 is a fragmentary elevation showing one of the billet-supporting beams at the mid-point in its operating cycle.
Figure 11:
Fig. 11 is an end vew of the structure shown in Fig. 10.
Figure 12:
Fig. 12 is a view similar to Fig. 10, but showing the beam at the three-quarter position in its operating cycle.
Figure 13:
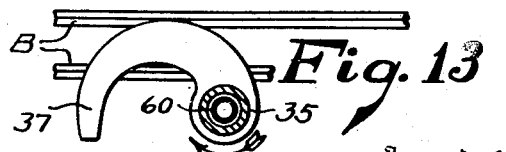
Fig. 13 is an end view of the structure shown in Fig. 12.
Figure 15:
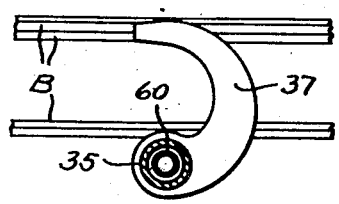
Fig. 15 is an end view of the structure shown in Fig. 14.
Figure 9:
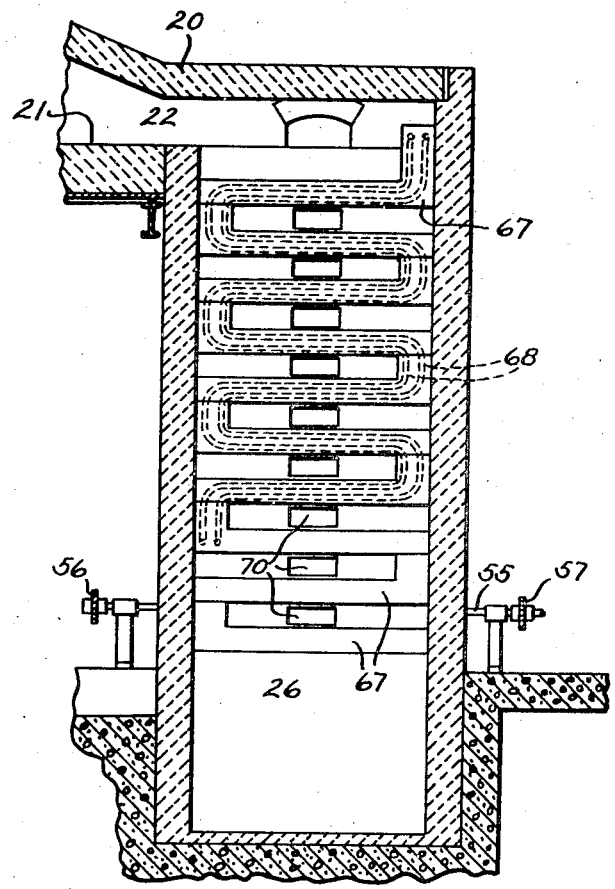
Fig. 9 is a section taken on the line 9—9 of Fig. 3.

The operation of the invention will now be apparent from the above disclosure. The billets B will be delivered one at a time in an endwise direction to the guides 40 by means of the pinch rolls 43, as indicated in Fig. 3. As soon as each billet has been placed upon these guides, all of the screws 35 will be turned through one complete revolution by means of the motor 53 and the various chain and sprocket connections. This will cause the cams 41 on the lowermost screws 35 to sweep the newly delivered billet off the guides 40 and into the helical grooves 36 of the screws. At the same time all of the previously delivered billets will be moved one step along the screws, the billet nearest the cam 37 on each screw being engaged thereby and placed upon the free end of the screw thereabove, as indicated in Figs. 10 and 15 inclusive. The cams 37 on the uppermost screws will deposit a billet on the free ends of the cantilever beams 29, whereupon the pusher bars 31 will be given one reciprocation to advance the entire top row of billets along the hearth 21. Heated billets will be withdrawn when desired through one of the doors 24. Fuel and air for combustion will be supplied through the burner openings 23, and the hot gases will travel rearwardly through the chamber 22 over the tops of the billets on the hearth, these billets being heated largely by radiation from the flame and from the hot gases. From the chamber 22 the gases will travel downwardly through the passage 26 in intimate contact with the billets supported on the screws 35, these billets being heated largely by convection. The gases will escape from the lower end of the passage 26 through the branch flues 27 to the main flue 28, the gas temperature having been reduced by this time to a relatively low value because of the highly efficient transfer of heat to the billets.

By circulating water inwardly through the pipes 60 and outwardly through the pipes 63, the hollow screws 35 and cams 37 will be protected against overheating, and it will accordingly be unnecessary to make these parts of expensive heat-resisting material. Similarly, the metal plates 67 will be cooled by radiation of heat therefrom to the water pipes 68. These plates 67 will receive the slight end-thrust caused by the friction of the billets on the revolving screws, and thereby protect the refractory sidewall from injury. All the billets can be cleared from the passage 26 whenever necessary by merely stopping the feeding of new billets by the pinch rolls 43 while continuing the operation of the screws 35 and the pusher bars 31.

Having thus described our invention, what we claim as new and desire to secure by Letters Patent is:

1. Conveying mechanism for a billet heating furnace having a passage for the flow of hot gases, the said mechanism comprising means supporting a plurality of vertically spaced layers of billets within the passage to absorb heat from the gases, means to move the billets progressively through each layer within the plane of the layer, and means to transfer the billets successively from each layer to the next layer.

2. Conveying mechanism for a billet heating furnace having a passage for the flow of hot gases, the said mechanism comprising means supporting a plurality of vertically spaced layers of billets within the passage to absorb heat from the gases, means to move the billets progressively through each layer with the directions of travel in adjacent layers opposite, and means to transfer the billets successively from each layer to the next layer so that the billets will follow a zig-zag course through the passage.

3. Conveying mechanism for a billet heating furnace having a passage for the downward flow of hot gases, the said mechanism comprising means supporting a plurality of vertically spaced layers of billets within the passage to absorb heat from the gases, means to move the billets progressively through each layer with the directions of travel in adjacent layers opposite, and means to transfer the billets successively from each layer to the next layer thereabove so that the billets will follow a zig-zag course upwardly through the passage.

4. Conveying mechanism for a billet heating furnace having a hearth, a horizontal passage for the flow of hot gases above the hearth, and a vertical passage through which the gases flow downwardly from the horizontal passage, the said mechanism comprising means supporting a plurality of vertically spaced layers of billets within the vertical passage to absorb heat from the gases, means to move the billets progressively through each layer with the directions of travel in adjacent layers opposite, means to supply additional billets to the lowermost layer, means to transfer the billets successively from each layer to the next layer thereabove so that the billets will follow a zig-zag course upwardly through the passage, and means to transfer billets from the uppermost layer to the hearth.

5. Conveying mechanism for a billet heating furnace having a hearth, a horizontal passage for the flow of hot gases above the hearth, and a vertical passage through which the gases flow downwardly from the horizontal passage, the said mechanism comprising means to move billets broadside in a continuous procession along a zig-zag course upwardly through the vertical passage to the hearth, and means to move billets broadside along the hearth.

6. Conveying mechanism for a billet heating furnace having a hearth, a horizontal passage for the flow of hot gases above the hearth, and a vertical passage through which the gases flow downwardly from the horizontal passage, the said mechanism comprising means to support a plurality of vertically spaced horizontal layers of billets within the vertical passage to absorb heat from the gases, means to move the billets progressively broadside through each layer with the directions of travel in adjacent layers opposite, means to supply additional billets to the lowermost layer, means to transfer the billets successively from each layer to the next layer thereabove so that the billets will follow a zig-zag course upwardly through the passage, means to transfer billets from the uppermost layer to the hearth, and means to move billets broadside along the hearth.

7. Conveying mechanism for a billet heating furnace having a passage for the flow of hot gases, the said mechanism comprising a plurality of sets of cantilever beams extending into the passage and arranged to support a plurality of vertically spaced layers of billets to absorb heat from the gases, the beams for adjacent layers extending in opposing directions, means to move the billets in each layer broadside along the associated beams, and means to transfer the billets successively from each set of beams to the beams in the adjacent set.

8. Conveying mechanism for a billet heating furnace having a passage for the downward flow of hot gases, the said mechanism comprising a plurality of sets of cantilever beams extending into the passage and arranged to support a plurality of vertically spaced layers of billets to absorb heat from the gases, the beams for adjacent layers extending in opposing directions, means to move the billets in each layer broadside along the associated beams in a direction away from the free ends thereof, and means to lift the billets successively from each set of beams and deposit them on the free ends of the beams in the set next thereabove.

9. Conveying mechanism for a billet heating furnace having a passage for the flow of hot gases, the said mechanism comprising a plurality of sets of cantilever beams extending into the passage and arranged to support a plurality of vertically spaced layers of billets to absorb heat from the gases, the beams for adjacent layers extending in opposing directions and each beam having a helical groove extending therearound to receive the billets, means to rotate the beams and cause the billets to move broadside along the same, and means to transfer the billets successively from each set of beams to the beams in the adjacent set.

10. Conveying mechanism for a billet heating furnace having a passage for the downward flow of hot gases, the said mechanism comprising a plurality of sets of cantilever beams extending into the passage and arranged to support a plurality of vertically spaced layers of billets to absorb heat from the gases, the beams for adjacent layers extending in opposing directions and each beam having a helical groove extending therearound to receive the billets, means to rotate the beams and cause the billets in each layer to move broadside along the associated beams in a direction away from the free ends thereof, and means to lift the billets successively from each set of beams and deposit them on the free ends of the beams in the set next thereabove.

11. Conveying mechanism for a billet heating furnace having a passage for the downward flow of hot gases, the said mechanism comprising a plurality of sets of cantilever beams extending into the passage and arranged to support a plurality of vertically spaced layers of billets to absorb heat from the gases, the beams for adjacent layers extending in opposing directions and each beam having a helical groove extending therearound to receive the billets, means to rotate the beams and cause the billets in each layer to move broadside along the associated beams in a direction away from the free ends thereof, and a cam on each beam adjacent the supported end thereof, the cams being shaped and arranged to lift the billets successively from the corresponding sets of beams and deposit them on the free ends of the beams in the set next thereabove.

12. Conveying mechanism for a billet heating furnace having a passage for the downward flow of hot gases, the said mechanism comprising a plurality of sets of cantilever beams extending into the passage and arranged to support a plurality of vertically spaced layers of billets to absorb heat from the gases, the beams for adjacent layers extending in opposing directions and each beam having a helical groove extending therearound to receive the billets, means to rotate the beams and cause the billets in each layer to move broadside along the associated beams in a direction away from the free ends thereof, and a spiral-shaped cam on each beam adjacent the supported end thereof, the helical grooves continuing along the peripheral surfaces of the cams and finally reversing in hand to discharge the billets successively therefrom on to the free ends of the beams next above.

13. Conveying mechanism for a billet heating furnace having a passage for the downward flow of hot gases, the said mechanism comprising a plurality of sets of cantilever beams extending into the passage and arranged to support a plurality of vertically spaced layers of billets to absorb heat from the gases, each beam having a helical groove extending therearound to receive the billets, the beams for adjacent layers extending in oposite directions and their helical grooves being of opposite hand, means to rotate all the beams in the same direction and cause the billets in each layer to move broadside along the associated beams in a direction away from the free ends thereof, metal plates in one wall of the passage in position to receive the end thrust of the billets caused by friction of the rotating beams thereon, and means to lift the billets successively from each set of beams and deposit them on the free ends of the beams in the set next thereabove.

14. Conveying mechanism for a billet heating furnace having a hearth, a horizontal passage for the flow of hot gases rearwardly above the hearth, and a vertical passage through which the gases flow downwardly from the rear end of the horizontal passage, the said mechanism comprising a plurality of vertically spaced sets of rotatable cantilever beams extending into the vertical passage to support vertically spaced layers of billets for absorption of heat from the gases, the uppermost set of beams extending forwardly and the remaining sets extending alternately in a rearward and forward direction, each beam having a helical groove extending therearound to receive the billets, means to rotate the beams and cause the billets in each layer to move broadside along the associated beams in a direction away from the free ends thereof, a set of stationary cantilever beams extending rearwardly from the hearth at the top of the vertical passage and somewhat above the uppermost set of rotatable beams, cams on the rotatable beams adjacent the supported ends thereof, the cams being shaped and arranged to lift the billets successively from the corresponding sets of beams and deposit them on the free ends of the beams in the set next thereabove, and means to move the billets broadside in a forward direction along the stationary beams and the hearth.

DAVID P. ANDERSON.
STRICKLAND KNEASS, JR.

REFERENCES CITED

The following references are of record in the file of this patent:

UNITED STATES PATENTS

| Number | Name | Date |
| --- | --- | --- |
| 881,602 | Marr | Mar. 10, 1908 |
| 1,328,239 | Schaefer | Jan. 13, 1920 |
| 2,214,421 | Kneass | Sept. 10, 1940 |